US011605092B2

(12) United States Patent
Smith et al.

(10) Patent No.: US 11,605,092 B2
(45) Date of Patent: Mar. 14, 2023

(54) SYSTEMS AND METHODS FOR EXPEDITED RESOURCE ISSUE NOTIFICATION AND RESPONSE

(71) Applicant: BANK OF AMERICA CORPORATION, Charlotte, NC (US)

(72) Inventors: Maria Konyakhina Smith, Gastonia, NC (US); John Henry Denning, Charlotte, NC (US); Ruchira Ghosh, Southlake, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 129 days.

(21) Appl. No.: 17/176,789

(22) Filed: Feb. 16, 2021

(65) Prior Publication Data
US 2022/0261814 A1 Aug. 18, 2022

(51) Int. Cl.
*G06Q 20/42* (2012.01)
*G06Q 20/40* (2012.01)
*G06Q 20/38* (2012.01)

(52) U.S. Cl.
CPC .......... *G06Q 20/42* (2013.01); *G06Q 20/389* (2013.01); *G06Q 20/405* (2013.01); *G06Q 20/4016* (2013.01)

(58) Field of Classification Search
None
See application file for complete search history.

(56) References Cited

U.S. PATENT DOCUMENTS

| | | |
|---|---|---|
| 1,083,965 A | 1/1914 | Wacker |
| 6,330,546 B1 | 12/2001 | Gopinathan et al. |
| 6,418,436 B1 | 7/2002 | Degen et al. |
| 7,480,631 B1 | 1/2009 | Merced et al. |
| 8,666,841 B1 | 3/2014 | Claridge et al. |
| 10,127,554 B2 | 11/2018 | Russell et al. |
| 10,318,936 B2 | 6/2019 | Muthu et al. |
| 10,510,078 B2 * | 12/2019 | Le .......................... G06Q 20/401 |
| 10,699,276 B1 | 6/2020 | Smith et al. |
| 10,748,127 B2 | 8/2020 | Novac et al. |
| 10,757,154 B1 | 8/2020 | Jacobs et al. |
| 10,769,606 B2 | 9/2020 | Novac et al. |
| 10,832,246 B2 | 11/2020 | Novac et al. |
| 2004/0236696 A1 | 11/2004 | Aoki et al. |
| 2007/0073519 A1 | 3/2007 | Long |
| 2009/0210344 A1 | 8/2009 | Lange et al. |
| 2010/0250364 A1 | 9/2010 | Song et al. |
| 2010/0274691 A1 | 10/2010 | Hammad et al. |

(Continued)

Primary Examiner — Neha Patel
Assistant Examiner — Nicholas K Phan
(74) Attorney, Agent, or Firm — Moore & Van Allen PLLC; Nicholas C. Russell

(57) ABSTRACT

Embodiments of the invention are directed to systems, methods, and computer program products for intelligent transaction information sharing, issue notification, and remedial response. By utilizing a common platform for information sharing between multiple financial entities, the invention provides a channel of communication between these entities in order to provide preemptive information as to potential problematic resource transfers. The system is also adaptive in that it can be adjusted based on the needs or goals of the entity or team utilizing it, and may adapt over time in an intelligent fashion to identify and alert of patterns developing over a cross-transaction dataset in real time.

17 Claims, 6 Drawing Sheets

(56) References Cited

U.S. PATENT DOCUMENTS

| | | | |
|---|---|---|---|
| 2017/0140377 A1* | 5/2017 | Rechert | G06Q 20/108 |
| 2018/0240083 A1 | 8/2018 | Kakaio et al. | |
| 2019/0294786 A1 | 9/2019 | Villavicencio et al. | |
| 2019/0377819 A1* | 12/2019 | Filliben | G06F 16/23 |
| 2022/0020028 A1* | 1/2022 | Wilczek | G06Q 20/4016 |

* cited by examiner

SYSTEMS AND METHODS FOR EXPEDITED RESOURCE ISSUE NOTIFICATION AND RESPONSE

BACKGROUND

Resource transactions often involve accounts at multiple different entities. In order to prevent malfeasant resource transactions, it may be crucial for multiple entities to communicate and share information about resource account patterns and history. Currently, there is no ideal aggregator or channel of communication allowing for comprehensive information sharing account intel in order to anticipate and avoid resource loss.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The systems and methods described herein address the above needs by providing intelligent system and methods for expedited resource transaction issue notification and response. By utilizing a common platform for information sharing between multiple financial entities, the invention provides a channel of communication between these entities in order to provide information as to the likelihood that any given resource transaction may be problematic or potentially malfeasant. The system is also adaptive, in that it can be adjusted based on the needs or goals of the entity or team utilizing it. For instance, the system may be adjusted to analyze transactions on a first-time payment basis, analyze transfers over a given amount threshold, or analyze transfers that appear to indicate a pattern uncharacteristic of the sender or beneficiary account. The invention further includes the ability to share such information in real time between entities, providing a first pass filter for transactions prior to processing the transactions. Given that post-processing transaction reversal may be costly or impossible in some instances, the proactive approach of the present invention offers an efficient and cost-saving approach to identifying and addressing problematic transactions before the entities involved may incur substantial loss. In addition to utilizing adaptive and programmable thresholds for transaction analysis, the invention also includes that ability for intelligent emergent pattern recognition which may be extrapolated and used to cross-flag transactions that may share on or more similar characteristics (e.g., the same sender, beneficiary, amount, frequency, time period, or the like).

Embodiments of the invention relate to systems, methods, and computer program products for intelligent information sharing, the invention including: receive resource transaction data and metadata for processing and analysis, wherein the resource transaction data and metadata relate to a resource transfer between a resource account at an originating entity and a destination resource account at a beneficiary entity; store the resource transaction data and metadata in a datastore of an originating entity; analyze the resource transaction data and metadata and determine, based on one or more first-pass filter thresholds, if there is an issue with the resource transaction prior to authorizing the resource transfer; identify one or more issues and generate an issue code for each of the one or more issues; place the resource transfer on hold; and display an alert for the one or more issues codes via a common display interface provided to the originating entity and the beneficiary entity.

In some embodiments, the invention is further configured to: receive data from the beneficiary entity in response to the one or more issue codes displayed via the common display interface; transmit the data received from the beneficiary entity to the originating entity via the common display interface; conduct additional analysis of the resource transaction data and metadata in conjunction with the received data from the beneficiary entity; receive instructions for resolution of the one or more issue codes from the originating entity; and transmit instructions for issue resolution to the beneficiary entity via the common display interface.

In some embodiments, the invention is further configured to: authorize the resource transfer between the resource account at the originating entity and the destination resource account at the beneficiary entity; receive an issue code from the beneficiary entity for the authorized resource transfer and display the issue code via the common display interface; and automatically place the resource transfer on hold on until instructions for remedial action are received from the originating entity.

In some embodiments, the first-pass filter thresholds comprise a quantifiable threshold resource amount value, wherein the resource transaction passes the first pass filter if it is below the resource amount value.

In some embodiments, the first-pass filter thresholds comprise determining whether or not the resource transaction data and metadata matches the data and metadata in a historical database for one or more resource accounts.

In some embodiments, the invention is further configured to: analyze the resource transaction data and metadata in conjunction with historical transaction data via a machine learning algorithm; determine that the resource transfer should be cross-flagged according to a pattern identified in the historical transaction data; and generate an issue code to hold the resource transfer based on the determination that the resource transfer should be cross-flagged.

In some embodiments, the invention is further configured to: receive data indicating a resolution of the one or more issue codes; transmit the data indicating the resolution of the one or more issue codes via the common display interface; and authorize the resource transfer from the resource account to the destination resource account.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
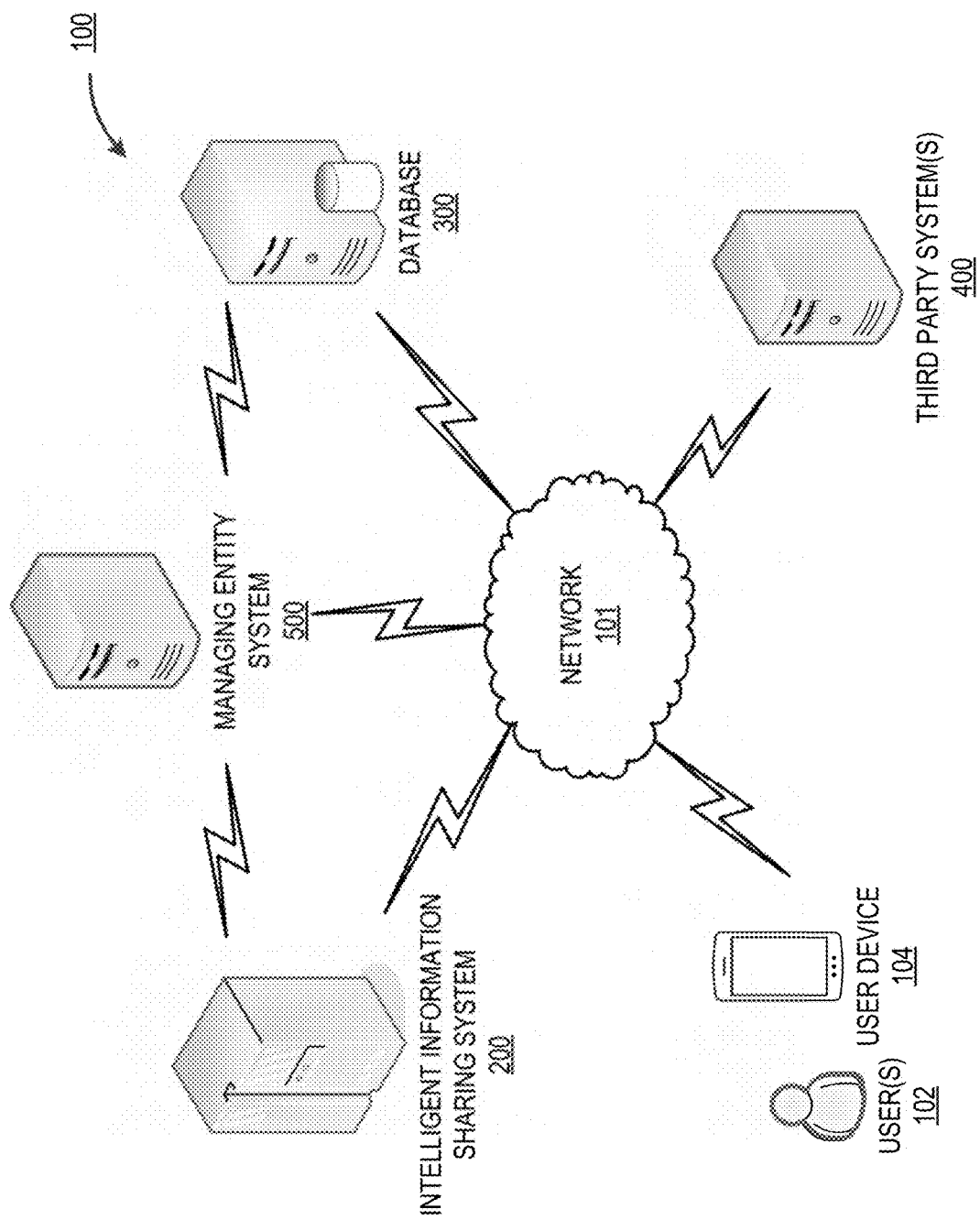
Figure 2:
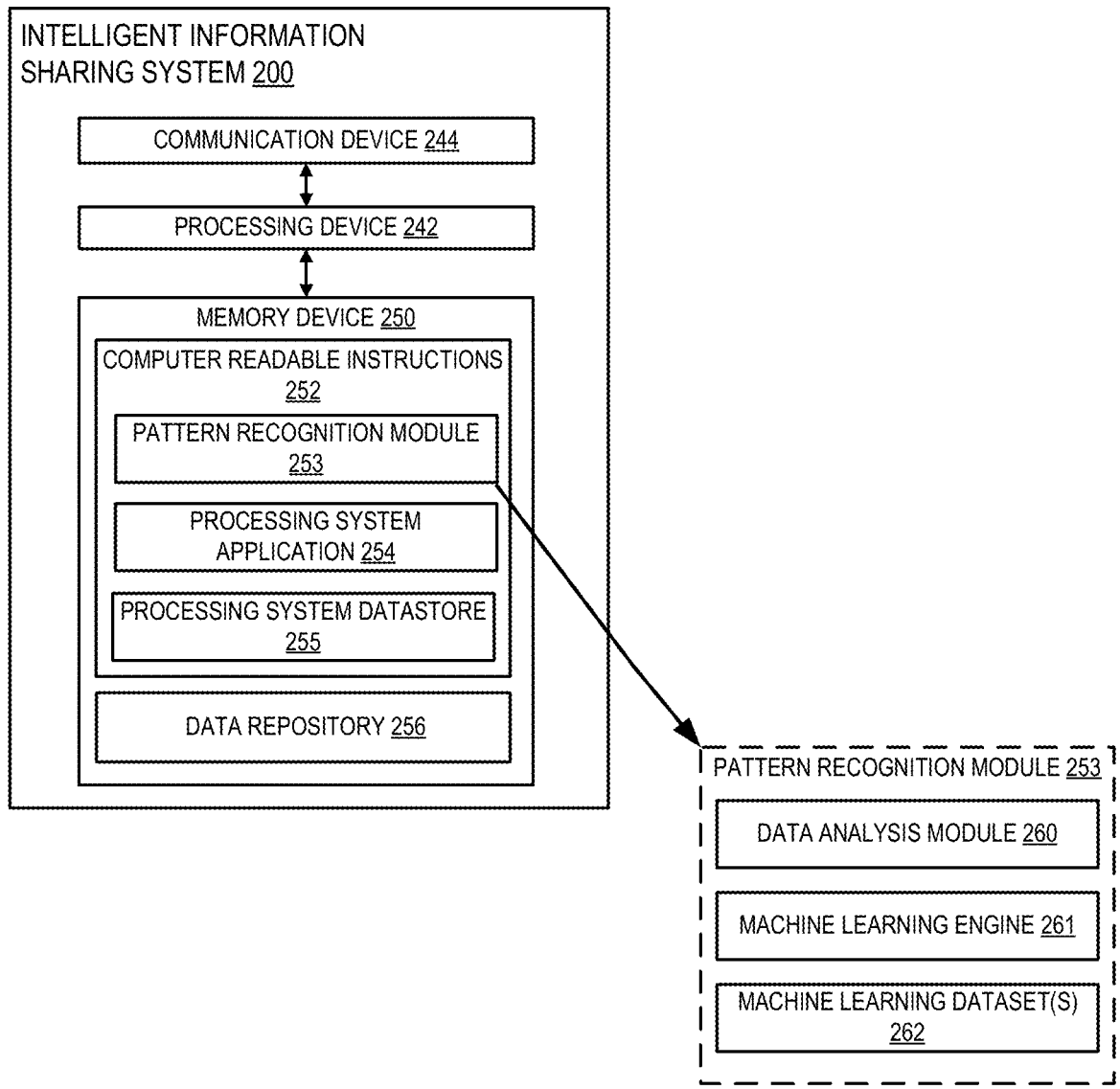
Figure 3:
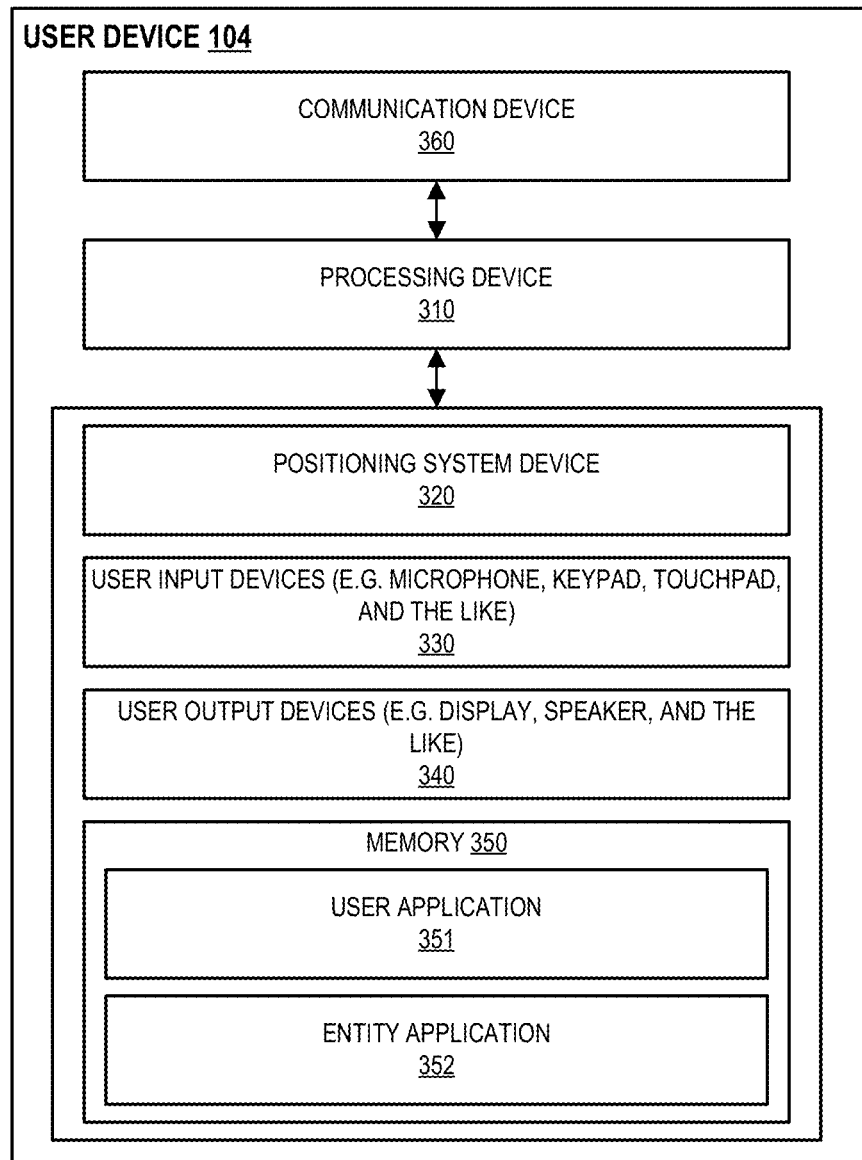
Figure 4:
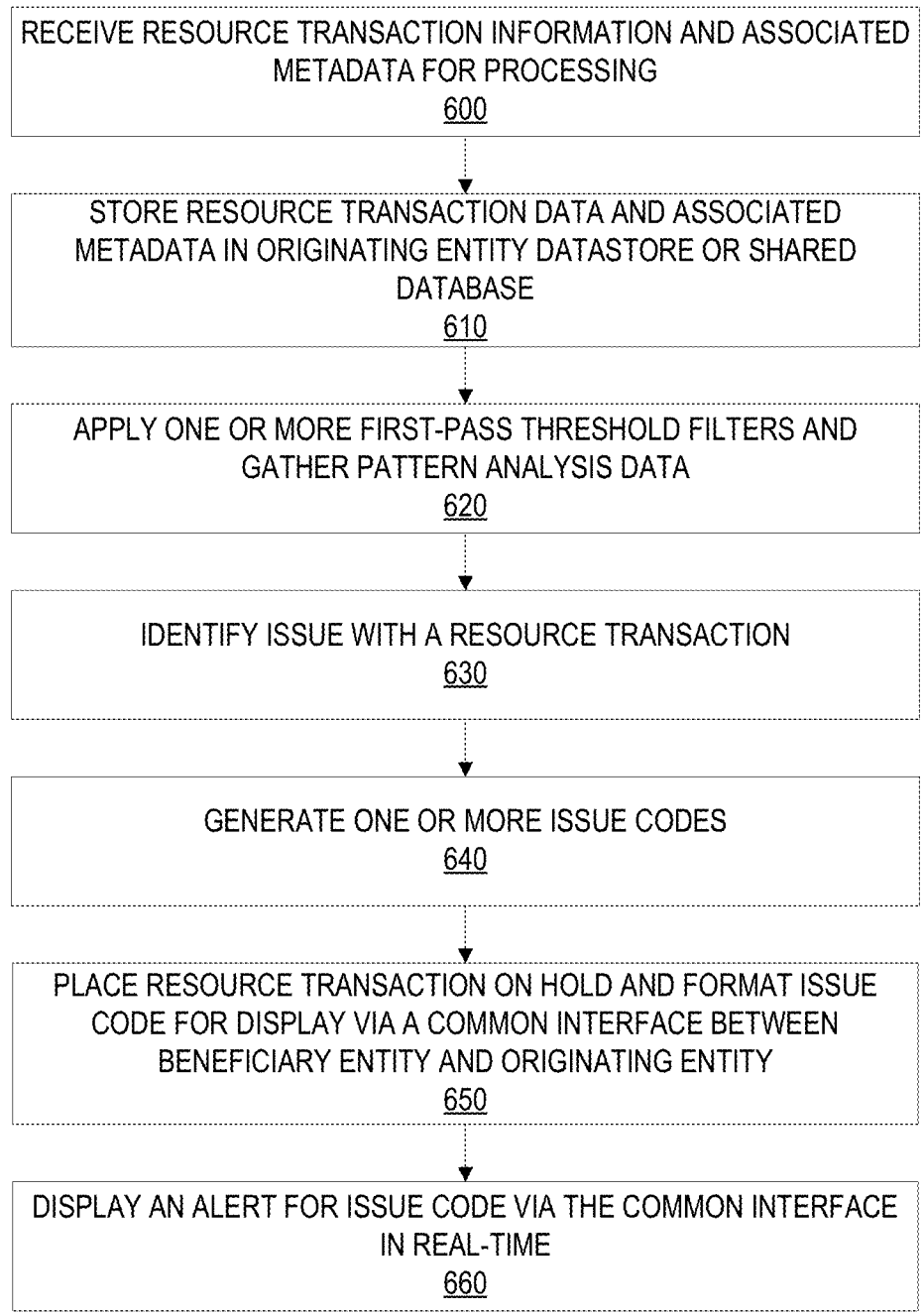
Figure 5:
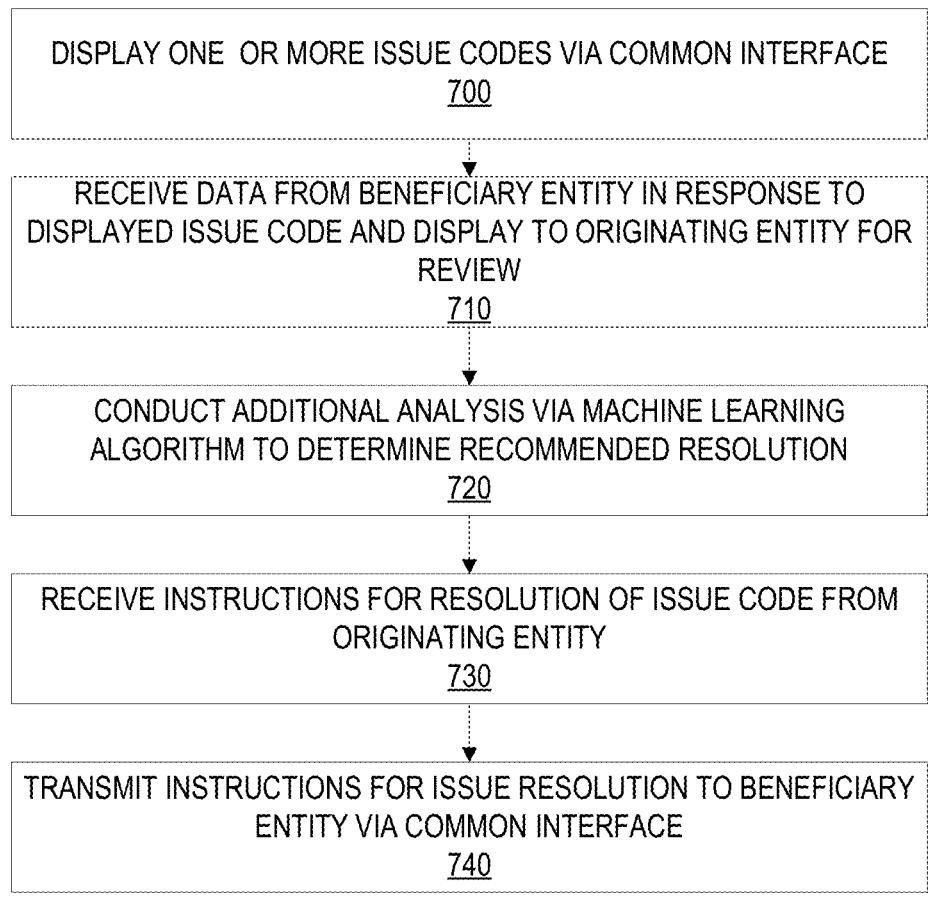
Figure 6:
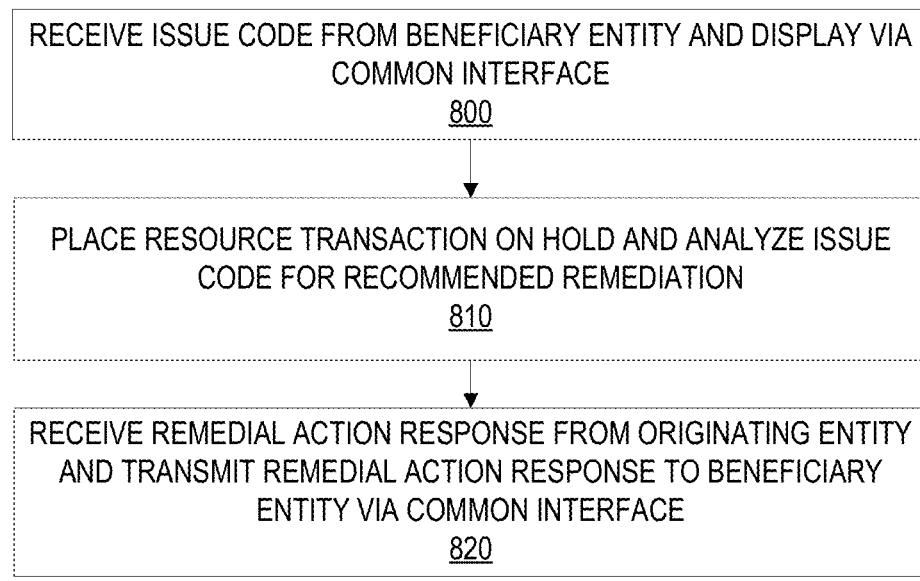

Having thus described embodiments of the invention in general terms, reference will now be made to the accompanying drawings, wherein:

FIG. 1 illustrates an operating environment for the expedited resource transaction issue notification and response system, in accordance with one embodiment of the present disclosure;

FIG. 2 is a block diagram illustrating the expedited resource transaction issue notification and response system;

FIG. 3 is a block diagram illustrating a user device associated with the expedited resource transaction issue notification and response system;

FIG. 4 is a flow diagram illustrating a process of preemptive issue identification using the expedited resource transaction issue notification and response system, in accordance with one embodiment of the present disclosure;

FIG. 5 is a flow diagram illustrating a process of issue resolution using the expedited resource transaction issue notification and response system, in accordance with one embodiment of the present disclosure; and FIG. 6 is a flow diagram illustrating a process of issue resolution using the expedited resource transaction issue notification and response system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some instances, a "user" is an individual who has a relationship with the entity, such as a customer or a prospective customer. Accordingly, as used herein the term "user device" or "mobile device" may refer to mobile phones, personal computing devices, tablet computers, wearable devices, and/or any portable electronic device capable of receiving and/or storing data therein and are owned, operated, or managed by a user.

"Transaction" or "resource transfer" as used herein may refer to any communication between a user and a third party merchant or individual to transfer funds for purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

The system allows for use of a machine learning engine to intelligently identify patterns in received resource transaction data as potentially malfeasant. The machine learning engine may be used to analyze historical data in comparison to real-time received transaction data in order to identify malfeasant transactions. The machine learning engine may also be used to generate intelligent aggregation of similar data based on metadata comparison resource transaction characteristics, which in some cases may be used to generate a database visualization of identified patterns similarities.

FIG. 1 illustrates an operating environment for the expedited resource transaction issue notification and response system, in accordance with one embodiment of the present disclosure. As illustrated, the operating environment 100 may comprise a user 102 and/or a user device 104 in operative communication with one or more third party systems 400 (e.g., web site hosts, registry systems, third party entity systems, or the like). The operative communication may occur via a network 101 as depicted, or the user 102 may be physically present at a location separate from the various systems described, utilizing the systems remotely. The operating environment also includes a managing entity system 500, intelligent information sharing system 200, a database 300, and/or other systems/devices not illustrated herein and connected via a network 101. As such, the user 102 may request information from or utilize the services of the intelligent information sharing system 200, or the third party system 400 by establishing operative communication channels between the user device 104, the managing entity system 500, and the third party system 400 via a network 101.

Typically, the intelligent information sharing system 200 and the database 300 are in operative communication with the managing entity system 500, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the third party system 400). In this regard, the wireless communication channel may further comprise near field communication (NFC), communication via radio waves, communication through the internet, communication via electromagnetic waves and the like.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, laptop computers, cameras, video recorders, audio/video player, radio, GPS devices, any combination of the aforementioned, or the like. The user device is described in greater detail with respect to FIG. 3.

The managing entity system 500 may comprise a communication module and memory not illustrated, and may be configured to establish operative communication channels with a third party system 400 and/or a user device 104 via a network 101. The managing entity may comprise a data repository 256. The data repository 256 may contain resource account data, and may also contain user data. This user data may be used by the managing entity to authorize or validate the identity of the user 102 for accessing the system (e.g., via a username, password, biometric security mechanism, two-factor authentication mechanism, or the like). In some embodiments, the managing entity system is in operative communication with the intelligent information sharing system 200 and database 300 via a private communication channel. The private communication channel may be via a network 101 or the intelligent information sharing system 200 and database 300 may be fully integrated within the managing entity system 500, such as a virtual private network (VPN), or over a secure socket layer (SSL).

As will be discussed in greater detail in FIG. 4 and FIG. 5, the managing entity system 500 may communicate with the intelligent information sharing system 200 in order to transmit data associated with observed resource transaction or account data by or via a plurality of third party systems 400. In some embodiments, the managing entity may utilize the features and functions of the intelligent information sharing system 200 to initialize remedial measures in response to identifying unauthorized or malfeasant transactions. In other embodiments, the managing entity and/or the one or more third party systems may utilize the intelligent information sharing system to react to identified trends or identified unauthorized resource transactions.

FIG. 2 illustrates a block diagram of the intelligent information sharing system 200 associated with the operating environment 100, in accordance with embodiments of the present invention. As illustrated in FIG. 2, the intelligent information sharing system 200 may include a communication device 244, a processing device 242, and a memory device 250 having an pattern recognition module 253, a processing system application 254 and a processing system datastore 255 stored therein. As shown, the processing device 242 is operatively connected to and is configured to control and cause the communication device 244, and the memory device 250 to perform one or more functions. In some embodiments, the pattern recognition module 253 and/or the processing system application 254 comprises computer readable instructions that when executed by the processing device 242 cause the processing device 242 to perform one or more functions and/or transmit control instructions to the database 300, the managing entity system 500, or the communication device 244. It will be understood that the pattern recognition module 253 or the processing system application 254 may be executable to initiate, perform, complete, and/or facilitate one or more portions of any embodiments described and/or contemplated herein. The pattern recognition module 253 may comprise executable instructions associated with data processing and analysis and may be embodied within the processing system application 254 in some instances. The intelligent information sharing system 200 may be owned by, operated by and/or affiliated with the same managing entity that owns or operates the managing entity system 500. In some embodiments, the intelligent information sharing system 200 is fully integrated within the managing entity system 500.

The pattern recognition module 253 may further comprise a data analysis module 260, a machine learning engine 261, and a machine learning dataset(s) 262. The data analysis module 260 may store instructions and/or data that may cause or enable the intelligent information sharing system 200 to receive, store, and/or analyze data received by the managing entity system 500 or the database 300. The data analysis module may process data to identify transaction issues or remedial recommendations as will be further discussed in FIG. 4. The machine learning engine 261 and machine learning dataset(s) 262 may store instructions and/or data that cause or enable the intelligent information sharing system 200 to determine, in real-time and based on received information, instances of unauthorized or malfeasant transactions. In some embodiments, the machine learning engine 261 and machine learning dataset(s) 262 may store instructions and/or data that cause or enable the intelligent information sharing system 200 to determine, in real-time and based on received information, a recommended remedial measure to be taken to stop or resolve problematic resource transactions. The machine learning dataset(s) 262 may contain data queried from database 300 or may be extracted or received from third party systems 400 via network 101. The database 300 may also contain meta-data related to transactions (e.g., account, time, associated parties, merchants, products, data format, resource value, or the like). In some embodiments, the machine learning dataset(s) 262 may also contain data relating to user activity or device information, which may be stored in a user account managed by the managing entity system.

The machine learning engine 261 may receive data from a plurality of sources and, using one or more machine learning algorithms, may generate one or more machine learning datasets 262. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. It is understood that additional or alternative machine learning algorithms may be used without departing from the invention.

The communication device 244 may generally include a modem, server, transceiver, and/or other devices for communicating with other devices on the network 101. The communication device 244 may be a communication interface having one or more communication devices configured to communicate with one or more other devices on the network 101, such as the intelligent information sharing system 200, the user device 104, other processing systems, data systems, etc.

Additionally, referring to intelligent information sharing system 200 illustrated in FIG. 2, the processing device 242 may generally refer to a device or combination of devices having circuitry used for implementing the communication and/or logic functions of the intelligent information sharing system 200. For example, the processing device 242 may include a control unit, a digital signal processor device, a microprocessor device, and various analog-to-digital converters, digital-to-analog converters, and other support circuits and/or combinations of the foregoing. Control and signal processing functions of the intelligent information sharing system 200 may be allocated between these processing devices according to their respective capabilities. The processing device 242 may further include functionality to operate one or more software programs based on computer-executable program code 252 thereof, which may be stored in a memory device 250, such as the processing system application 254 and the pattern recognition module 253. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 242 may be configured to use the network communication interface of the communication device 244 to transmit and/or receive data and/or commands to and/or from the other devices/systems connected to the network 101.

The memory device 250 within the intelligent information sharing system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 242 when it carries out its functions described herein.

FIG. 3 is a block diagram illustrating a user device associated with the expedited resource transaction issue notification and response system. The user device 104 may include a user mobile device or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, laptop computers, cameras, video recorders, audio/video player, radio, GPS devices, any combination of the aforementioned devices.

The user device 104 may generally include a processing device or processor 310 communicably coupled to devices such as, a memory device 350, user output devices 340 (for example, a user display or a speaker), user input devices 330 (such as a microphone, keypad, touchpad, touch screen, and the like), a communication device or network interface device 360, a positioning system device 320, such as a geo-positioning system device like a GPS device, an accelerometer, and the like, one or more chips, and the like.

The processor 310 may include functionality to operate one or more software programs or applications, which may be stored in the memory device 350. For example, the processor 310 may be capable of operating applications such as a user application 351, an entity application 352, or a web browser application. The user application 351 or the entity application may then allow the user device 104 to transmit and receive data and instructions to or from the third party system 400, intelligent information sharing system 200, and the managing entity system 500, and display received information via the user interface of the user device 104. The user application 351 may further allow the user device 104 to transmit and receive data to or from the managing entity system 500 (for example, via wireless communication or NFC channels), data and instructions to or from the intelligent information sharing system 200, web content, such as, for example, location-based content and/or other web page content, according to a Wireless Application Protocol (WAP), Hypertext Transfer Protocol (HTTP), and/or the like. The user application 351 may allow the managing entity system 500 to present the user 102 with a plurality of recommendations, identified trends, suggestions, transaction data, pattern data, graph data, statistics, and/or the like for the user to review. In some embodiments, the user interface displayed via the user application 351 or entity application 352 may be entity specific. For instance, while the intelligent information sharing system 200 may be accessed by multiple different entities, it may be configured to present information according to the preferences or overall common themes or branding of each entity system of third party system. In this way, each system accessing the intelligent information sharing system 200 may use unique aesthetic entity application 352 or user application 351 portal, but all entities may access the same information, given that they are permitted by the managing entity system 500.

The processor 310 may be configured to use the communication device 360 to communicate with one or more devices on a network 101 such as, but not limited to the third party system 400, the intelligent information sharing system 200, and the managing entity system 500. In this regard the processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 360 may also include a user activity interface presented in user output devices 340 in order to allow a user 102 to execute some or all of the processes described herein. The application interface may have the ability to connect to and communicate with an external data storage on a separate system within the network 101. The user output devices 340 may include a display (e.g., a liquid crystal display (LCD) or the like) and a speaker 334 or other audio device, which are operatively coupled to the processor 310. The user input devices 330, which may allow the user device 104 to receive data from the user 102, may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may also include a memory buffer, cache memory or temporary memory device 350 operatively coupled to the processor 310. Typically, one or more applications 351 and 352, are loaded into the temporarily memory during use. As used herein, memory may include any computer readable medium configured to store data, code, or other information. The memory device 350 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the intelligent information sharing system 200 performing one or more steps described herein in conjunction with other devices and systems, either automatically based on executing computer readable instructions of the memory device 250, or in response to receiving control instructions from the managing entity system 500. In some instances, the system refers to the devices and systems on the operating environment 100 of FIG. 1. The features and functions of various embodiments of the invention are be described below in further detail.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 is a flow diagram illustrating a process of preemptive issue identification using the expedited resource transaction issue notification and response system, in accordance with one embodiment of the present disclosure. As shown in block 600, the process begins whereby the intelligent information sharing system 200 receives resource transaction information and associated metadata for processing. Metadata may include, for example, originating account, beneficiary account, originating entity, beneficiary entity, time of transaction, associated parties, merchants, products, data format, resource value, or the like, associated with a particular resource transfer. The resource transaction information and associated metadata are stored in the originating entity database or a shared database, such as data repository 256 or database 300 respectively, as shown in block 610. Data may be stored in both locations depending on the information storage scheme applied by the managing entity system 500. In some embodiments, a subset of the resource transaction information may be shared on database 300 in a need-to-know fashion, while the majority of resource transaction information may be stored on the data repository 256 of the managing entity system. In other embodiments, the resource transaction information itself and associated metadata may not be shared between entities, but rather the entities may share decisions or conclusions drawn related to the resource transaction information instead via the intelligent information sharing system 200. In this way, the privacy of sensitive information of the resource transactions themselves may be preserved, while still allowing for entities to communicate effectively regarding potential issues with particular resource transactions. In this way, data may be altered in one or more ways as it is transferred in whole or in part to a shared database 300. For instance, data may be encrypted and stored in a hash output format, or data may be stripped of its metadata characteristics that indicate sensitive information, and may only be stored as masked or partially masked data in the shared database 300.

Next, as shown in block 620, the system applies one or more first-pass threshold filters and gathers pattern analysis data. First-pass threshold filters may comprise filters that are applied to given categories or subcategories of resource transactions that contain certain characteristics, such as, but not limited to, instances where a resource transaction is over a given amount, or instances where a certain resource transaction does not fit the characteristics or requirements of a particular resource account (e.g., name on account does not match, address for account does not match, account blocked, account limited to transaction value under resource transaction value, account is new and undergoing preliminary review, or the like). In other embodiments, the intelligent information sharing system 200 may analyze the resource transaction information in conjunction with historical data in order to determine a pattern or analysis output indicating a potential issue. For instance, the pattern recognition module 253 may employ the use of the machine learning engine 261 in order to gather similar resource transaction data via the data analysis module 260, and generate a machine learning dataset 262. In some embodiments, an ensemble of machine learning models may be used to analyze incoming data in real time in order to continuously update the machine learning model and improve its accuracy. In some embodiments, an ensemble of machine learning engines 261 or machine learning models may be utilized, the results of which may be compared on an ongoing basis in order to optimize the output of the machine learning dataset 262. In this way, the machine learning dataset may indicate a pattern or characteristic of historical data that is relevant to the immediate case of the resource transaction being analyzed, and may generate issue codes that the first-pass filter may not catch (e.g., account cross-flagged as interacting with one or more issue-prone accounts in the past, account shows similar transaction characteristics or transfer frequency to known malfeasant account, metadata indicates that incorrect name given has been used with past malfeasant transactions, beneficiary account under investigation and awaiting additional information from beneficiary entity, or the like).

As shown in block 630, once the system has identified an issue with the resource transaction, at this point the intelligent information sharing system 200 may generate one or more issue codes, as shown in block 640. At this stage, the intelligent information sharing system 200 may place the resource transaction on hold and format the issue code for display via a common interface between the beneficiary entity and originating entity, such as via the user application 351 or entity application 352 of the user device 104. Using the display interface of the user device 104, the intelligent information sharing system 200 may display an alert for the issue code via the common interface in real-time, allowing the beneficiary entity to conduct further review and provide responsive information back to the originating entity via the common interface.

FIG. 5 is a flow diagram illustrating a process of issue resolution using the expedited resource transaction issue notification and response system, in accordance with one embodiment of the present disclosure. As discussed in FIG. 4, the intelligent information sharing system 200 may generate one or more issue codes identified at the originating entity of the resource transaction, and display one or more issue codes via the common interface, as shown in block 700. The intelligent information sharing system 200 may receive data from the beneficiary entity in response to the displayed issue code and display this information to the originating entity for review, as shown in block 710.

At this point, the originating entity may use the information received from the beneficiary entity in order to conduct additional analysis, either via human review or via the machine learning engine 261. In some embodiments, the information received from the beneficiary entity may be satisfactory to generate instruction for resolution of the issue code, as shown in block 730. For instance, the resource transaction may have been placed on hold because the name on the destination account did not match the account name on file at the originating entity. In this case, the beneficiary entity may identify that the name on the account is a co-signor, authorized party, or the like, and may transmit this information back to the beneficiary entity for further analysis, at which point the originating entity may receive instructions for resolving the issue, and may release the hold on the resource transfer. As shown in block 740, the information regarding instructions for issue resolution may be transmitted by the intelligent information sharing system 200 to the beneficiary institution via the common interface, creating a history of issue identification and resolution that can later be referred back to if further issues arise.

FIG. 6 is a flow diagram illustrating a process of issue resolution using the expedited resource transaction issue notification and response system, in accordance with one embodiment of the present disclosure. In some instances, rather than the originating entity generating and posting an issue code via the common interface, the beneficiary entity may be in a position to flag a new issue that could not have been generated or for any reason was not generated at the originating entity, either for lack of pertinent information on the resource transaction, or by different analysis standards or pattern analysis frameworks between the originating entity and the beneficiary entity. For instance, the originating entity may have authorized the transfer of resources to a particular resource account at the beneficiary entity that has been cross-flagged as associated with malfeasant activity based on historical data at the disposal of the beneficiary entity alone. In this instance, the intelligent information sharing system 200 may receive an issue code from the beneficiary entity and display it via the common interface, as shown in block 800. At this stage, either the beneficiary entity or the originating entity may have placed the resource transaction on hold in order to analyze the issue code and determine a recommended remedial action, as shown in block 810.

As discussed, remedial actions may be determined via human review of the issue codes displayed via the user interface of the user device 104, or may be determined intelligently by utilizing a machine learning engine 261 of the pattern recognition module 253. For instance, the issue code generated and posted to the common interface by the beneficiary entity may be "beneficiary account name does not match wire instructions." In this instance, the wire instructions may have included a person's name or identity that does not match the information that the beneficiary entity has on file for the receiving account listed on the wire instructions. In this case, the originating entity may refer back to the information in the data repository 256 or database 300 to determine if the mis-match is material or not. For instance, the machine learning engine 261 may determine, based on historical data, that the mis-match between names is a common mis-spelling, a pseudonym used previously by the account holder, or the like, and may general a remedial action for the issue code to proceed with the resource transaction. In other embodiments, the machine learning engine 261 may not be able to reconcile the mis-match with available information, and may generate a remedial recommendation to the place the resource transaction on hold until more information can be fathered from the account holder whom initiated the transaction. These remedial actions may be posted to the common interface so that the beneficiary entity may view updated information in real-time as the originating entity updates the status of the investigation or resource transaction, as shown in block 820.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for intelligent information sharing system, the system comprising:
   at least one non-transitory storage device; and
   at least one processing device coupled to the at least one non-transitory storage device, wherein the at least one processing device is configured to:
   receive resource transaction data and metadata for processing and analysis, wherein the resource transaction data and metadata relate to a resource transfer between a resource account at an originating entity and a destination resource account at a beneficiary entity;
   store the resource transaction data and metadata in a datastore of the originating entity;
   analyze the resource transaction data and metadata and determine, based on one or more first-pass filter thresholds, if there is an issue with the resource transaction prior to authorizing the resource transfer;
   identify one or more issues and generate an issue code for each of the one or more issues;
   place the resource transfer on hold;
   display an alert for the one or more issues codes via a common display interface provided to the originating entity and the beneficiary entity;
   receive data from the beneficiary entity in response to the one or more issue codes displayed via the common display interface;
   transmit the data received from the beneficiary entity to the originating entity via the common display interface;
   conduct additional analysis of the resource transaction data and metadata in conjunction with the received data from the beneficiary entity;
   receive instructions for resolution of the one or more issue codes from the originating entity; and
   transmit instructions for issue resolution to the beneficiary entity via the common display interface.

2. The system of claim 1, further configured to:
   authorize the resource transfer between the resource account at the originating entity and the destination resource account at the beneficiary entity;
   receive an issue code from the beneficiary entity for the authorized resource transfer and display the issue code via the common display interface; and
   automatically place the resource transfer on hold on until instructions for remedial action are received from the originating entity.

3. The system of claim 1, wherein the first-pass filter thresholds comprise a quantifiable threshold resource amount value, wherein the resource transaction passes the first pass filter if it is below the resource amount value.

4. The system of claim 1, wherein the first-pass filter thresholds comprise determining whether or not the resource transaction data and metadata matches the data and metadata in a historical database for one or more resource accounts.

5. The system of claim 1, further configured to:
analyze the resource transaction data and metadata in conjunction with historical transaction data via a machine learning algorithm;
determine that the resource transfer should be cross-flagged according to a pattern identified in the historical transaction data; and
generate an issue code to hold the resource transfer based on the determination that the resource transfer should be cross-flagged.

6. The system of claim 1, further configured to:
receive data indicating a resolution of the one or more issue codes;
transmit the data indicating the resolution of the one or more issue codes via the common display interface; and
authorize the resource transfer from the resource account to the destination resource account.

7. A computer program product for intelligent information sharing, the computer program product comprising at least one non-transitory computer-readable medium having computer-readable program code portions embodied therein, the computer-readable program code portions comprising:
an executable portion configured to receive resource transaction data and metadata for processing and analysis, wherein the resource transaction data and metadata relate to a resource transfer between a resource account at an originating entity and a destination resource account at a beneficiary entity;
an executable portion configured to store the resource transaction data and metadata in a datastore of the originating entity;
an executable portion configured to analyze the resource transaction data and metadata and determine, based on one or more first-pass filter thresholds, if there is an issue with the resource transaction prior to authorizing the resource transfer;
an executable portion configured to identify one or more issues and generate an issue code for each of the one or more issues;
an executable portion configured to place the resource transfer on hold;
an executable portion configured to display an alert for the one or more issue codes via a common display interface provided to the originating entity and the beneficiary entity;
an executable portion configured to receive data from the beneficiary entity in response to the one or more issue codes displayed via the common display interface;
an executable portion configured to transmit the data received from the beneficiary entity to the originating entity via the common display interface;
an executable portion configured to conduct additional analysis of the resource transaction data and metadata in conjunction with the received data from the beneficiary entity;
an executable portion configured to receive instructions for resolution of the one or more issue codes from the originating entity; and
an executable portion configured to transmit instructions for issue resolution to the beneficiary entity via the common display interface.

8. The computer program product of claim 7, further configured to:
authorize the resource transfer between the resource account at the originating entity and the destination resource account at the beneficiary entity;
receive an issue code from the beneficiary entity for the authorized resource transfer and display the issue code via the common display interface; and
automatically place the resource transfer on hold on until instructions for remedial action are received from the originating entity.

9. The computer program product of claim 7, wherein the first-pass filter thresholds comprise a quantifiable threshold resource amount value, wherein the resource transaction passes the first pass filter if it is below the resource amount value.

10. The computer program product of claim 7, wherein the first-pass filter thresholds comprise determining whether or not the resource transaction data and metadata matches the data and metadata in a historical database for one or more resource accounts.

11. The computer program product of claim 7, configured to:
analyze the resource transaction data and metadata in conjunction with historical transaction data via a machine learning algorithm;
determine that the resource transfer should be cross-flagged according to a pattern identified in the historical transaction data; and
generate an issue code to hold the resource transfer based on the determination that the resource transfer should be cross-flagged.

12. The computer program product of claim 7, further configured to:
receive data indicating a resolution of the one or more issue codes;
transmit the data indicating the resolution of the one or more issue codes via the common display interface; and
authorize the resource transfer from the resource account to the destination resource account.

13. A computer-implemented method for intelligent information sharing, the method comprising:
providing a computing system comprising a computer processing device and a non-transitory computer readable medium, wherein the computer readable medium comprises configured computer program instruction code, such that when said instruction code is operated by said computer processing device, said computer processing device performs the following operations:
receive resource transaction data and metadata for processing and analysis, wherein the resource transaction data and metadata relate to a resource transfer between a resource account at an originating entity and a destination resource account at a beneficiary entity;
store the resource transaction data and metadata in a datastore of the originating entity;
analyze the resource transaction data and metadata and determine, based on one or more first-pass filter thresholds, if there is an issue with the resource transaction prior to authorizing the resource transfer;
identify one or more issues and generate an issue code for each of the one or more issues;
place the resource transfer on hold;
display an alert for the one or more issue codes via a common display interface provided to the originating entity and the beneficiary entity;

receive data from the beneficiary entity in response to the one or more issue codes displayed via the common display interface;

transmit the data received from the beneficiary entity to the originating entity via the common display interface;

conduct additional analysis of the resource transaction data and metadata in conjunction with the received data from the beneficiary entity;

receive instructions for resolution of the one or more issue codes from the originating entity; and transmit instructions for issue resolution to the beneficiary entity via the common display interface.

14. The computer-implemented method of claim 13, further configured to:

authorize the resource transfer between the resource account at the originating entity and the destination resource account at the beneficiary entity;

receive an issue code from the beneficiary entity for the authorized resource transfer and display the issue code via the common display interface; and automatically place the resource transfer on hold on until instructions for remedial action are received from the originating entity.

15. The computer-implemented method of claim 13, wherein the first-pass filter thresholds comprise a quantifiable threshold resource amount value, wherein the resource transaction passes the first pass filter if it is below the resource amount value.

16. The computer-implemented method of claim 13, wherein the first-pass filter thresholds comprise determining whether or not the resource transaction data and metadata matches the data and metadata in a historical database for one or more resource accounts.

17. The computer-implemented method of claim 13, further configured to:

analyze the resource transaction data and metadata in conjunction with historical transaction data via a machine learning algorithm;

determine that the resource transfer should be cross-flagged according to a pattern identified in the historical transaction data; and generate an issue code to hold the resource transfer based on the determination that the resource transfer should be cross-flagged.

* * * * *